Figure 1:
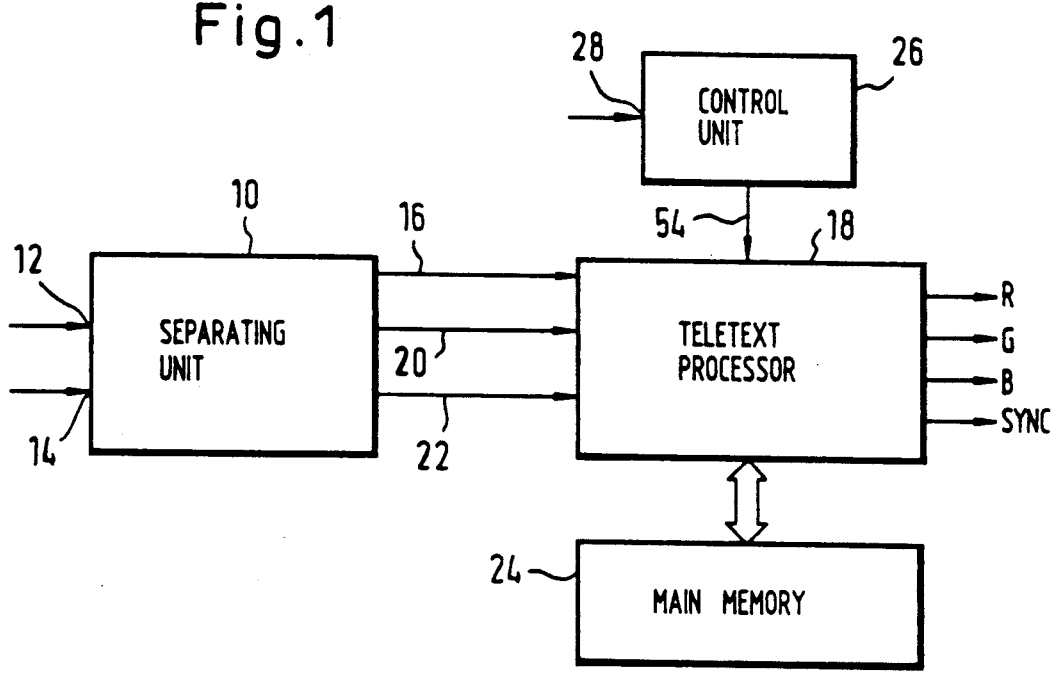

United States Patent [19]
Fink et al.

[11] Patent Number: 5,237,411
[45] Date of Patent: Aug. 17, 1993

[54] SYSTEM AND METHOD FOR PROCESSING TELETEXT INFORMATION INCLUDED WITH VIDEO SIGNAL UTILIZING BUFFERED INDIVIDUAL TELETEXT INFORMATION PAGES

[75] Inventors: Helmut Fink, Schernfeld; Trevor C. Jones, Mainburg, both of Fed. Rep. of Germany; Colin Hinson, Blunham, England

[73] Assignee: Texas Instruments Deutschland GmbH, Fed. Rep. of Germany

[21] Appl. No.: 758,033

[22] Filed: Sep. 12, 1991

[30] Foreign Application Priority Data

Sep. 12, 1990 [DE] Fed. Rep. of Germany ....... 4028942

[51] Int. Cl.$^5$ .............................................. H04N 7/04
[52] U.S. Cl. ..................................... 358/146; 358/147
[58] Field of Search ........................ 358/142, 146, 147

[56] References Cited

U.S. PATENT DOCUMENTS

| | | | |
|---|---|---|---|
| 4,841,365 | 6/1989 | Guenot et al. | 358/147 |
| 4,908,707 | 3/1990 | Kinghorn | 358/147 |
| 4,992,871 | 2/1991 | Bensch et al. | 358/147 X |
| 5,038,211 | 8/1991 | Hallenback | 358/146 X |
| 5,038,212 | 8/1991 | Van den Hombergh | 358/147 X |

Primary Examiner—Victor R. Kostak
Attorney, Agent, or Firm—William E. Hiller; Richard Donaldson; Jay M. Cantor

[57] ABSTRACT

System for processing teletext information which makes it possible practically without any delay to reproduce the information pages transmitted by television transmitters on the screen of a television set, the updated state of the reproduced pages being ensured. The system includes a buffer (46) for the data signals corresponding in each case to an information page. Furthermore, it includes a microprocessor (32) which receives the buffered data signals and within the period required for the transmission of an information page stores them in a main memory (24) for all information pages. In dependence upon a page request signal entered by a user a control unit (26) generates a control command for the microprocessor (32) which causes the latter to fetch from the main memory (24) the page requested by the page request signal and supply it to an image processor (42) which generates from the data signals the signals necessary for the reproduction on the screen.

7 Claims, 2 Drawing Sheets

SYSTEM AND METHOD FOR PROCESSING TELETEXT INFORMATION INCLUDED WITH VIDEO SIGNAL UTILIZING BUFFERED INDIVIDUAL TELETEXT INFORMATION PAGES

The invention relates to an arrangement for processing teletext information received together with a video signal by a television receiver, the teletext information consisting of S information pages which are transmitted at least once within a transmission cycle and are representable as required on the screen of the television receiver and each have a predetermined number N of lines, of which a subamount n is transmitted with each field of the video signal, comprising a separating unit for separating the teletext information from the video signal and a converter for converting data signals corresponding to an information page to a data format suitable for reproduction on the screen of the television receiver.

The term "teletext" is used in English-language literature for an information transmission system with the aid of which along with a television picture additional information can be transmitted which can be represented on the screen of a television receiver when the latter is equipped with a corresponding decoder. In the Federal Republic the term "videotext" is used for this system.

When using the teletext or videotext system the additional information is transmitted in unused lines of the television image. The information is accommodated in individual pages which in the PAL system are each made up of 25 lines. In the PAL system, in which 625 television lines are used with a picture frequency of 50 Hz, for example with each television picture seven information lines of a videotext page are transmitted, which results in a transmission time for an entire page of 71.43 ms. Theoretically, 1 to 16 teletext lines/field can be transmitted. In practice a transmission time of 80 ms is assumed because for a videotext page further control information is also transmitted and requires a few additional lines.

The teletext or videotext information comes from a data base in which several hundred pages are stored. Each page consists of a head which contains the control information for the page and is followed by up to 24 information lines. The individual pages are continuously transmitted in cyclic sequence by the television transmitters. The time interval between repetitions of the same pages is governed by the number of lines per picture and the number of pages per cycle. In a data base having 1000 pages and a transmission time of 80 ms per page the time interval between the transmission of the same page is 80 s, i.e. a transmission cycle lasts 80 s.

This example shows that it can take 80 s before a page is again transmitted and consequently it may also take 80 s until a user wishing to see a specific page is also presented with the latter on the screen of the television receiver.

At present, the incoming teletext information is continuously searched to determine whether one or more pages are contained, the maximum number of pages which can be simultaneously acquired being eight. For this purpose, for example up to eight page acquisition circuits are present continuously investigating whether the head of the pages being searched for appears. If the page head is found it is stored together with the information content of the page so that the page can then be reproduced on the screen when called up. This procedure of constantly monitoring the occurrence of desired pages with one or more acquisition circuits leads to very complicated decoder circuits if it is desired to monitor continuously the greatest possible number of pages in order to have them immediately available for callup when a user wishes to reproduce the corresponding page on the screen. The page acquisition circuits have a relatively complicated makeup so that their number cannot be increased indefinitely without making the decoder circuit so expensive that it can no longer be accommodated in a television set with acceptable costs. In addition, a problem is involved with the updating of the pages found by the data acquisition circuits and buffered. In a transmission cycle in which all the pages of the data bank are transmitted by the transmitter the decoder circuit can only acquire and buffer a number of pages corresponding to the acquisition circuits available. A data base will for example be assumed having 1000 pages and a page transmission duration of 80 ms in a decoder circuit having eight acquisition circuits and a memory for 256 pages. In one transmission cycle the decoder circuit can acquire eight pages and store them intermediately. The time necessary for updating these pages is then $(1000 . 80)$ ms$\times(256/8) = 42.67$ min.

This means that a user wishing to observe a page of the data base on the screen cannot be sure that he is also actually looking at the latest state of the information offered to him. Apart from the waiting time which must pass for the user until the page is offered to him, the updating state of the pages is therefore also in need of improvement when employing the teletext or videotext systems usual hitherto.

The invention is based on the problem of providing an arrangement for processing teletext information in which the page requested by a user can be reproduced on the screen almost without delay and it is also ensured that the information offered corresponds to the updated state except for one transmission cycle.

To solve this problem the arrangement set forth at the beginning for processing teletext information includes a buffer for the data signals corresponding in each case to an information page, a microprocessor which receives the buffered data signals and within the period required for transmitting an information page stores them in a main memory for the S information pages, and a control unit which in dependence upon a page request signal entered by a user generates a control command for the microprocessor which causes the latter to fetch the data signals corresponding to the page requested by the page request signal from the main memory and supply them to the converter circuit.

In an arrangement according to the invention all the teletext information represented by the individual information pages is always processed within a transmission cycle and buffered in a memory. From said memory the individual information pages can be called up as required and reproduced on the screen of the television receiver. Within a transmission cycle each page can be updated so that the user is always offered the latest state of the transmitted information pages.

Figure 2:
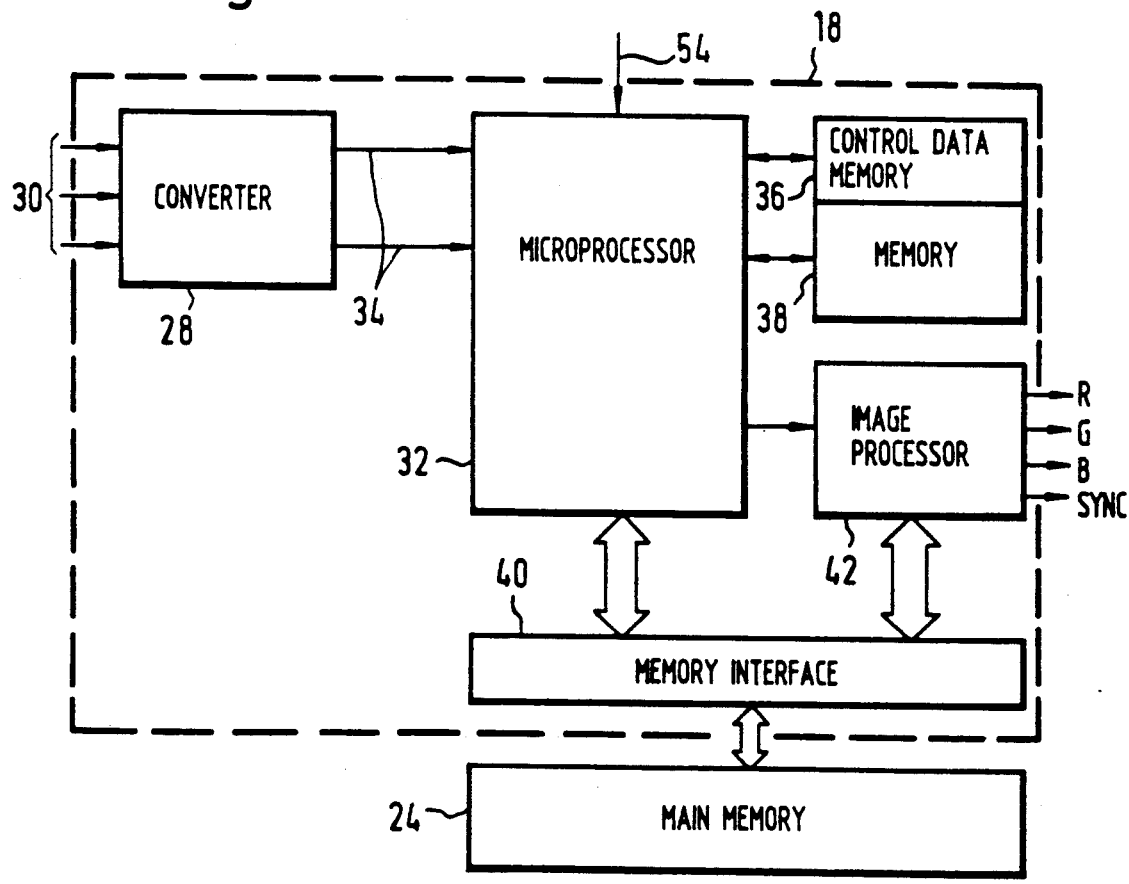
Figure 3:
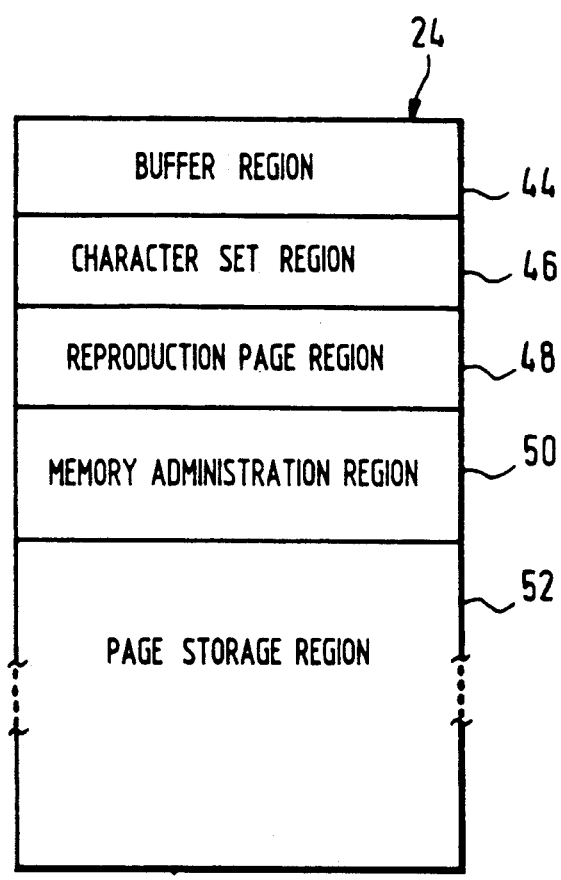

The invention will now be explained by way of example with the aid of the drawings, wherein:

FIG. 1 shows a general block circuit diagram for explaining the arrangement according to the invention, FIG. 2 shows a block circuit diagram of the teletext processor of FIG. 1, and FIG. 3 is a schematic representation of the structure of the memory used.

The arrangement to be described includes as basic components a separating unit 10 to which at an input 12 video signals are supplied and optionally at another input 14 synchronizing signals usually present in a television set. The separating unit 10 separates from the video signal teletext and synchronizing signals which are usually transmitted by the television transmitters together with the video signals. The teletext signals are transmitted via a line 16 to a teletext processor 18 which processes them in the manner still to be described. In addition, via a line 20 clock signals are supplied to the teletext processor 18 and via a line 22 synchronizing signals from the separating unit 10. The teletext processor 18 furnishes at its output the usual R, G, B, and SYNC signals with which the teletext information can be reproduced on the screen of the television set. The teletext processor 18 is further connected to a main memory 24 in which the teletext information received by the television receiver is stored and can then be reproduced as required on the screen of the television set.

Via a control unit 26 a user can send a page request signal to the teletext processor 18 which thereupon fetches from the memory 24 the teletext information of the page having a number corresponding to the page request signal entered by the user and processes said information. The page request signal can be supplied to the control unit 26 via an input 28 for example from a keyboard or also by means of a remote control.

In FIG. 2 a general block circuit diagram of the teletext processor 18 is shown. The teletext processor 18 includes a converter 28 receiving at its inputs 30, data, clock and synchronizing signals. Said converter 28 receives the teletext data separated from the video signal by the separating unit in serial form and converts it to an 8-bit format which is suitable for further processing in a microprocessor 32 which represents the nucleus unit of the teletext processor. Via lines 34 the microprocessor 32 receives the teletext data in 8-bit format from the converter 28 and processes said data under the control by control data from a control data memory 36 and in accordance with a program stored in a program memory 38. The incoming data from the converter 28 are supplied by the microprocessor 32 via a memory interface 40 to the main memory 24. In addition, the microprocessor 32 processes data which it has previously stored in the main memory 24 in such a manner that from said data with the aid of an image processor 44 the usual R, G, B and SYNC signals are generated for reproduction on the screen of the television set.

Before now describing exactly how the microprocessor 32 processes the signals supplied to it, the makeup of the main memory 24 will be briefly explained with reference to FIG. 3. As FIG. 3 shows, the main memory 24 is divided into several regions, that is a buffer region 44, a character set region 46, a reproduction page region 48, a memory administration region 50 and a page storage region 52. The buffer region 44 serves for buffering incoming teletext data as long as it must be held ready for processing by the microprocessor 18. In the character set region 46 signals are stored which are adapted to generate the characters or symbols to be reproduced on the screen of the television receiver. The characters are letters, numbers and graphic symbols. The reproduction page region 48 contains in each case the data corresponding to a page of the teletext information to be reproduced. The memory administration region contains address tables each indicating at which addresses in the page storage region 52 the respective pages of the teletext information are stored. Finally, in the page storage region 52 the individual pages of the teletext information are stored.

In a practical embodiment the buffer region 44 has the storage capacity 3 KB, the reproduction page region 48, the capacity 1 KB and the page storage region has a storage capacity totalling 2 MB for the storing of 2000 pages of the teletext information.

The teletext processor 18 illustrated in FIG. 2 when used in the PAL system receives every 20 ms a group of teletext data corresponding to a predetermined number of lines of a teletext page. This data group is transmitted with a rate of about 1 Megabyte/s. Because of this high transmission rate the data are not immediately processed by the microprocessor 32 but first buffered in a buffer region 44 of the main memory 24. The transmission of this data group requires at the most only about 1.1 ms so that the microprocessor 32 then has 18.9 ms available for processing said data before the next data group arrives.

During the 18.9 ms the microprocessor 32 reads the content of the buffer region 44 line by line and performs an ordered storing of the data in the page storage region 52. On storing said data, the information contained in the memory administration region 50 is updated and it is therefore exactly defined at which points of the page memory area 52 the data belonging to specific pages of the teletext information is stored.

With the assumed number of 1000 pages of the teletext data bank, in this manner after expiry of a complete transmission cycle of 80 s the entire teletext information is stored in the page storage region 52. During each further cycle the individual pages are updated as required so that the latest state of the page content is always available in the page storage area.

If a user now generates a page request signal via the control unit 26 said signal passes via the line 54 to the microprocessor 32 which thereupon fetches from the memory 24, in particular from the page memory region 52 thereof, the information belonging to said page, supplies said information to the image processor 42 via the memory interface and thus releases said information for reproduction on the screen of the television set.

Since in the arrangement described the requested page is already present in the main memory 24, it is not necessary firstly to wait for reception of the corresponding page in order then to reproduce it on the screen after corresponding processing; instead, the page can be represented on the screen practically immediately after entry of the page request signal. Since with each transmission cycle updating of the corresponding pages takes place the user can assume that the latest state of the page requested by him is always offered to him.

We claim:

1. A system for processing data signals representative of teletext information as transmitted with a video signal for reception by a television receiver and display as teletext information with a television picture on a television screen of the television receiver, wherein the teletext information comprises a plurality of information pages as represented by data signals and transmitted at least once within a transmission cycle for presentation as required on the television screen of the television receiver, each one of said plurality of information pages of teletext information having a predetermined number N of lines, of which a subamount number n is transmitted with each field of the video signal, said system comprising:

a separating unit for separating the data signals representative of the teletext information from the video signals;

a teletext processor connected to the output of said separating unit for receiving the separated data signals representative of the teletext information from said separating unit;

a teletext information memory bi-directionally connected to said teletext processor in which the data signals representative of said plurality of information pages of teletext information are storable; and a control unit connected to an input of said teletext processor and responsive to a page request signal entered by a user for generating a control command to said teletext processor causing said teletext processor to fetch the data signals corresponding to the information page identified by the page request signal from the user from said teletext information memory so as to provide the fetched data signals to said teletext processor;

said teletext processor including a mirocprocessor connected to the output of said separating unit for receiving the data signals therefrom, said microprocessor being connected to said control unit and to said teletext information memory for fetching the data signals corresponding to the information page identified by the page request signal entered by a user into said control unit and in response to the control command as generated by said control unit from said teletext information memory, an image processor connected to the output of said microprocessor for producing output data for reproduction of teletext information on the television screen of the television receiver, and program means for regulating said microprocessor in the storage and acquisition of data signals in and out of said teletext information memory and the output of data signals corresponding to an information page of teletext information to said image processor; and a buffer memory operably connected to said teletext information memory and to said microprocessor of said teletext processor and in which data signals representative of teletext information corresponding to an information page of said plurality of information pages are storable;

said microprocessor initially providing data signals to said buffer memory for each information page of teletext information of said plurality of information pages of teletext information to be stored in said teletext information memory and thereafter transferring the contents of said buffer memory into said teletext information memory for each information page, said microprocessor receiving said data signals from said buffer memory within the period required for transmitting data signals representative of an information page and storing the buffered data signals in said teletext information memory in which the data signals representative of the plurality of information pages of teletext information are storable.

2. A system for processing data signals representative of teletext information as set forth in claim 1, wherein said buffer memory is a buffer memory region of said teletext information memory;

said teletext information memory further including address data stored therein and representative of the addresses of the information pages as represented by the data signals stored in said teletext information memory; and said microprocessor in conjunction with said buffer memory region updating the address data upon storing the buffered data signals representative of the information pages in said teletext information memory.

3. A system for processing data signals representative of teletext information as set forth in claim 1, wherein said teletext processor further includes a converter interposed between said separating unit and said microprocessor and respectively connected to the output of said separating unit and an input of said microprocessor for converting the data signals provided as an output from said separating unit and corresponding to an information page into a data format as converted data signals suitable for reproduction on the television screen of the television receiver for input to said microprocessor.

4. A system for processing data signals representative of teletext information as set forth in claim 3, wherein said separating unit provides separated data signals, clock signals and synchronizing signals as outputs therefrom; and said converter of said teletext processor having plural inputs for receiving said data signals, clock signals and synchronizing signals as output from said separating unit and converting said data signals representative of teletext information into said data format as converted data signals.

5. A method for processing data signals representative of teletext information as transmitted with a video signal for reception by a television receiver and display as teletext information with a television picture on a television screen of the television receiver, said method comprising:

intermittently transmitting with the video signal for reception by the television receiver data signals representative of teletext information corresponding to a predetermined number of lines of an information page of teletext information during a recurring time interval of the video signal transmission;

separating the transmitted data signals from the video signal;

converting the separated data signals into a data format as converted data signals suitable for reproduction on the television screen of the television receiver;

initially storing the converted data signals in a buffer memory prior to processing;

during the time interval preceding the next transmission of data signals representative of teletext information corresponding to the predetermined number of lines of an information page of teletext information, processing the content of the buffer memory;

performing an ordered storing of the processed converted data signals from the buffer memory in a teletext information memory; and continuing the intermittent transmission of data signals with the video signal followed by converting the separated data signals into a data format as converted data signals and processing of the converted data signals as initially stored in said buffer memory and the subsequent storage of the processed converted data signals in the teletext information memory until converted data signals representative of a plurality of information pages of teletext information comprising the complete content of teletext information are stored within said teletext information memory.

6. A method of processing data signals representative of teletext information as set forth in claim 5, further including transmitting the plurality of information pages of teletext information comprising the complete content of teletext information at least once within a transmission cycle for subsequent storage as converted data signals within said teletext information memory.

7. A method of processing data signals representative of teletext information as set forth in claim 6, further including updating the content of the plurality of information pages of teletext information as stored in the teletext information memory during subsequent transmission of data signals with the video signal in succeeding transmission cycles by initially storing the updated converted data signals as transmitted during a succeeding transmission cycle in the buffer memory;

processing the content of the data signals within the buffer memory and transferring the converted data signals from the buffer memory in an ordered manner to the teletext information memory for storage in the teletext information memory; and updating individual information pages of teletext information as stored in the teletext information memory as succeeding versions of the same information pages as processed in the buffer memory are transferred individually to the teletext information memory.

* * * * *